United States Patent [19]

Arai et al.

[11] 4,393,419
[45] Jul. 12, 1983

[54] SYNCHRONIZING SIGNAL DETECTION PROTECTIVE CIRCUIT

[75] Inventors: Takao Arai, Yokohama; Takashi Hoshino, Fujisawa; Masaharu Kobayashi, Yokohama, all of Japan

[73] Assignee: Hitachi, Ltd., Tokyo, Japan

[21] Appl. No.: 305,379

[22] Filed: Sep. 24, 1981

[30] Foreign Application Priority Data

Sep. 26, 1980 [JP] Japan ............................. 55-132927

[51] Int. Cl.³ ...................... H04N 5/04; G11B 27/10
[52] U.S. Cl. ................................ 360/37.1; 358/319; 358/314; 360/38.1
[58] Field of Search ............... 358/319, 337, 336, 314, 358/148; 360/37.1, 38.1

[56] References Cited

U.S. PATENT DOCUMENTS 3,767,849 10/1973 Wessels ............................. 360/37.1
4,024,571 5/1977 Dischert et al. ................ 358/319 X
4,313,136 1/1982 Kimura ......................... 360/37.1 X Primary Examiner—Robert L. Richardson
Attorney, Agent, or Firm—Antonelli, Terry & Wands

[57] ABSTRACT

A PCM recording reproducing apparatus transforms the audio signal into PCM data for recording the signal as a PCM signal in the television signal format on the video tape used in VTR, and transforms the PCM signal reproduced in the VTR back into the audio signal. The PCM apparatus is provided with a sync signal detection protective circuit which ensure the detection of the sync signal in the reproduced PCM signal. The sync signal detection protective circuit selectively uses two kinds of time gate signals in consideration of skew noises and so on. When skew does not occur, the signal with a short gating duration is selected, and only when skew, dropout, jitter or the likes has occurred failing to sample the sync signal, the signal with a long gating duration is selected.

5 Claims, 6 Drawing Figures

SYNCHRONIZING SIGNAL DETECTION PROTECTIVE CIRCUIT

The present invention relates to a synchronizing (sync) signal detection protective circuit for detecting the sync signal on a recording medium on which information to be recorded and the sync signal are recorded consecutively, and more particularly to a sync signal detection protective circuit for detecting the sync signal in audio PCM (Pulse Code Modulation) data reproduced from a video tape.

The PCM recording/reproducing apparatus is known in this field of the art. In the PCM apparatus, the audio signal is transformed into the digital signal by way of PCM system and a resultant PCM signal is recorded on the video tape through a video tape recorder in the format of the Japanese television signal standard (NTSC system), and the PCM signal in the television signal format reproduced by the video tape recorder is transformed back into the analog audio signal. The PCM signal has, for example, 245 data blocks corresponding to 245 horizontal sync signals (expressed as 245H) for a vertical synchronizing period ($T_V = 262.5 T_H$ where $T_V$ and $T_H$ represent the period of the vertical and the horizontal synchronizing signals, respectively). A data block in each period of the horizontal sync signal (1H) consists of nine data including six information words, that is, three PCM signal data supplied from the R-channel of a stereo system, three PCM signal data supplied from the L-channel of stereo system, two error correcting words for correcting the error in these words, and an error detecting word, that is, a CRC data for detecting the error of these words. The vertical sync signal and the horizontal sync signal in the video signal are independently used as the sync signal for the data block, and particularly the horizontal sync signal is used as the sync signal for each data block.

Data blocks having such data block structure are recorded on the video tape in the standard video signal format.

In reproducing the recorded PCM signal, the reproduced signal from the video tape recorder (VTR) is first separated into block data and the sync signal. However, during reproducing the signal by the VTR, a skew caused by elongation of the tape or switching operation of the magnetic head, and a dropout caused by flaws or dusts on the tape, may result in a missing of PCM signal data and the sync signal or an incorrect timing of the sync signal. It is known that the timing error caused by a skew typically within the range of $\pm 10$ to $\pm 20$ $\mu s$. The dropout mostly falls within 2H, but some times a dropout of 2-3H or more may occur. A burst noise caused by a dropout can be detected erroneously as a horizontal sync signal.

In prior art system, the sync signal, i.e., the horizontal sync signal in the video signal, has been detected using a gate circuit designed in consideration of the horizontal sync period of approximately 63.5 $\mu s$ and the allowable skew of 20 $\mu s$, for example. In this system, the gate circuit is closed for 43.5 $\mu s$ (63.5 $\mu s$ - 20 $\mu s$) after a horizontal sync signal has been detected to avoid a detection of noises. After 43.5 $\mu s$ has elapsed, the gate circuit is opened for detection of the sync signal. After detecting the sync signal, the gate circuit is closed again for 43.5 $\mu s$. In this system, however, a noise can still be detected erroneously as a sync signal during the period of opening of the gate circuit. Furthermore, if a dropout having a period of 2-3H or more occurs, noises caused by the dropout will be detected every 43.5 $\mu s$ as sync signals.

It is therefore an object of the present invention to provide a sync signal detection protective circuit for detecting the sync signal in high noise immunity on a recording medium on which information to be recorded and the sync signal have been recorded.

According to the present invention, there is provided a sync signal detection protective circuit for detecting the sync signal on a recording medium on which information to be recorded and the sync signal are recorded consecutively, comprising a first time gate circuit for generating a first time gate signal at a first predetermined time before an expected occurrence of said synchronizing signal, a second time gate circuit for generating a second time gate signal at a second predetermined time before said expected occurrence of said synchronizing signal, said second predetermined time occurring before said first predetermined time, a time gate signal switching circuit connected to the first and second time gate circuits and adapted to conduct one of the first and second time gate signals selectively, a sync signal gate circuit connected to the time gate signal switching circuit and adapted to control the gating time for detecting the sync signal in response to one of the first and second time gate signals, a compensatory sync signal generating circuit for generating a compensatory sync signal, and a sync signal switching circuit which conducts the sync signal when it has been detected by the sync signal gate circuit in response to the first and second time gate signals and conducts the compensatory sync signal when the sync signal has not been detected by the sync signal gate circuit in response to the first time gate signal.

The first time gate signal has a short gating time for detecting a normal sync signal having a period near the period of the horizontal sync signal, e.g. 63.5 $\mu s$. Accordingly, the sync signal gate circuit controlled by the first time gate signal has a better noise immunity, preventing an erroneous detection of a sync signal caused by a skew and a burst noise. If the sync signal has not been detected by the first time gate signal, it is determined that a skew has occurred. In this case, the gating time of the sync signal gate circuit is controlled by the second time gate signal with a relatively wide gating time for catching a sync signal even under the occurrence of a skew, so that the subsequent sync signal is detected. At the same time a sync signal is generated immediately by the compensatory sync signal generating circuit, and the second time gate circuit is activated in order to generate the second time gate signal. The second time gate signal has a wide gating time enough to detect the subsequent sync signal.

These and other objects, features and advantages of the present invention will be more apparent from the following description taken in conjunction with the accompanying drawings, in which.

Figure 1:
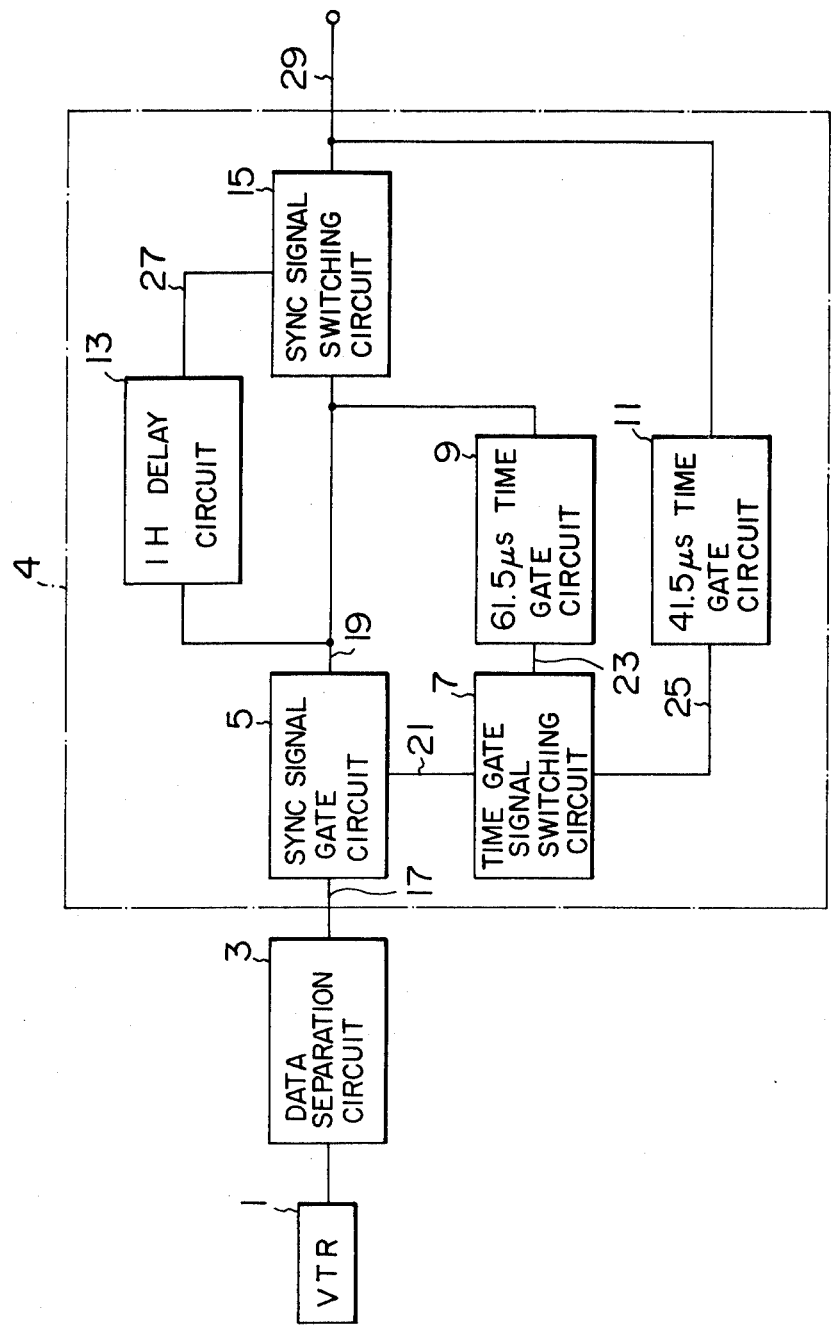
FIG. 1 is a block diagram of the sync signal detection protective circuit embodying the present invention.

FIG. 1 shows an embodiment of the sync signal detection protective circuit of the present invention which is applied to the reproduction of the audio PCM signal in the video tape recorder. In the figure, reference number 1 denotes a video tape recorder (VTR) for reproducing the audio signal which is recorded in PCM code on the video tape, and 2 is a data separation circuit for separating the output video signal of the VTR into PCM formatted data and the sync signal. The sync signal corresponds to the sync signal in the Japanese standard television signal. Reference number 4 generally shows the arrangement of the sync signal detection protective circuit embodying the present invention. A sync signal gate circuit 5 detects a sync separation output 17 provided by the data separation circuit, and also serves to prevent noises. A time gate signal switching circuit 7 selects one of two gating times for the sync signal gate circuit 5. Reference numbers 9 and 11 are time gate circuits (counters) for determining the gating time for the sync signal gate circuit. The time gate circuit 9 generates a time gate signal 23 having a duration of 61.5 $\mu$s for closing the gate circuit 5, and a short period for opening the gate circuit 5 after the expiration of 61.5 $\mu$s. The time gate circuit 11 generates a time gate signal having a duration of 41.5 $\mu$s for providing a wider gating time for the gate circuit 5 in order to detect the sync signal even in the occurrence of a skew. The time gate signal switching circuit 7 selects one of the time gate signals 23 and 25 to generate a gate signal 21. Reference number 13 is a 1H delay circuit (counter) which functions as a compensatory sync signal generating circuit for generating a compensatory sync signal 27 when the gate circuit 5 controlled by the time gate signal 23 with a duration of 61.5 $\mu$s could not detect a sync signal 19 due to skew. Reference number 15 is a sync signal switching circuit for selectively conducting the sync signal 19 or the supplementary sync signal 27 so that a sync output 29 which is free from noises is produced. The time gate signal switching circuit 7 takes precedence in selecting the output of the time gate circuit 9 of 61.5 $\mu$s and it selects the time gate circuit 11 of 41.5 $\mu$s only when the sync signal 19 could not be detected by the gate signal based on the time gate signal 23 having a duration of 61.5 $\mu$s. The time gate circuit 9 generates a narrow time gate pulse 23 which occurs after 61.5 $\mu$s following the preceding detection of the sync signal 19 is reset by the subsequently detected sync signal 19. For example, the time gate signal has a duration of about 2 $\mu$s from the point of 61.5 $\mu$s to the point of approximately 63.5 $\mu$s for the normal sync signal. The circuit 9 is designed so that the pulse 23 falls to zero if the sync signal is not detected until the time of 65.5 $\mu$s, and thus the time gate signal 23 has a maximum pulse width of 4 $\mu$s and the sync signal 19 is detected by the gate circuit 5 only during this period. The time gate circuit 11 of 41.5 $\mu$s is set by the sync output 29, and after 41.5 $\mu$s, it generates a pulse 25 which lasts until the subsequent sync output 29 is generated. Accordingly, when the sync signal 19 has not been detected by the gate signal 21 caused by the time gate signal 23 of 61.5 $\mu$s, the time gate signal 25 of 41.5 $\mu$s is selected and the gate circuit 5 is opened. The gating time for the gate circuit 5 will last until the subsequent sync signal is detected.

Figure 2:
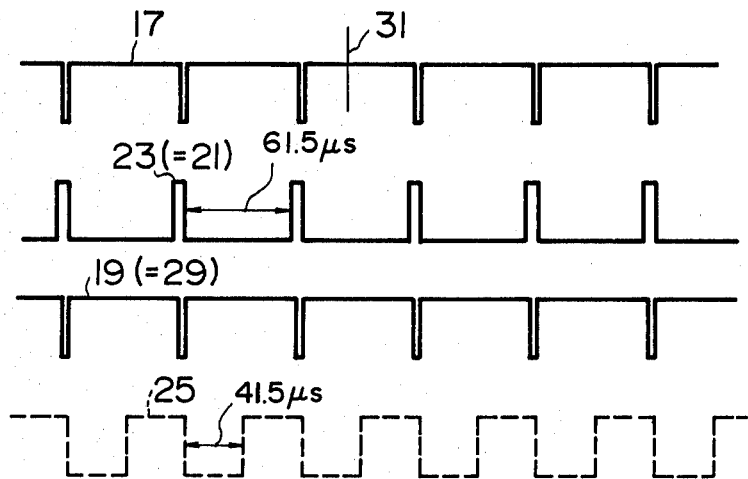
FIGS. 2, 3 and 4 are timing charts for various signals, explaining the operation of the sync signal detection protective circuit shown in FIG. 1.
Figure 3:
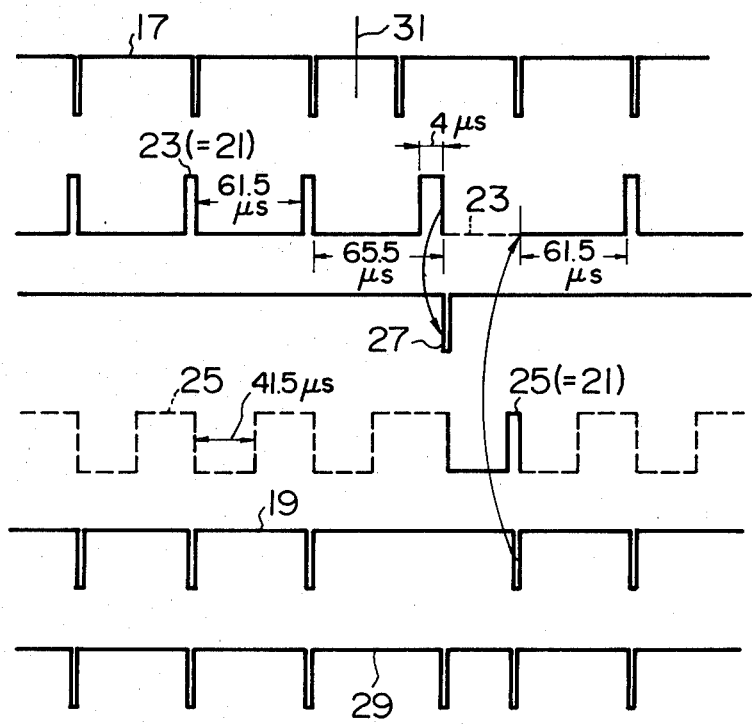
Figure 4:
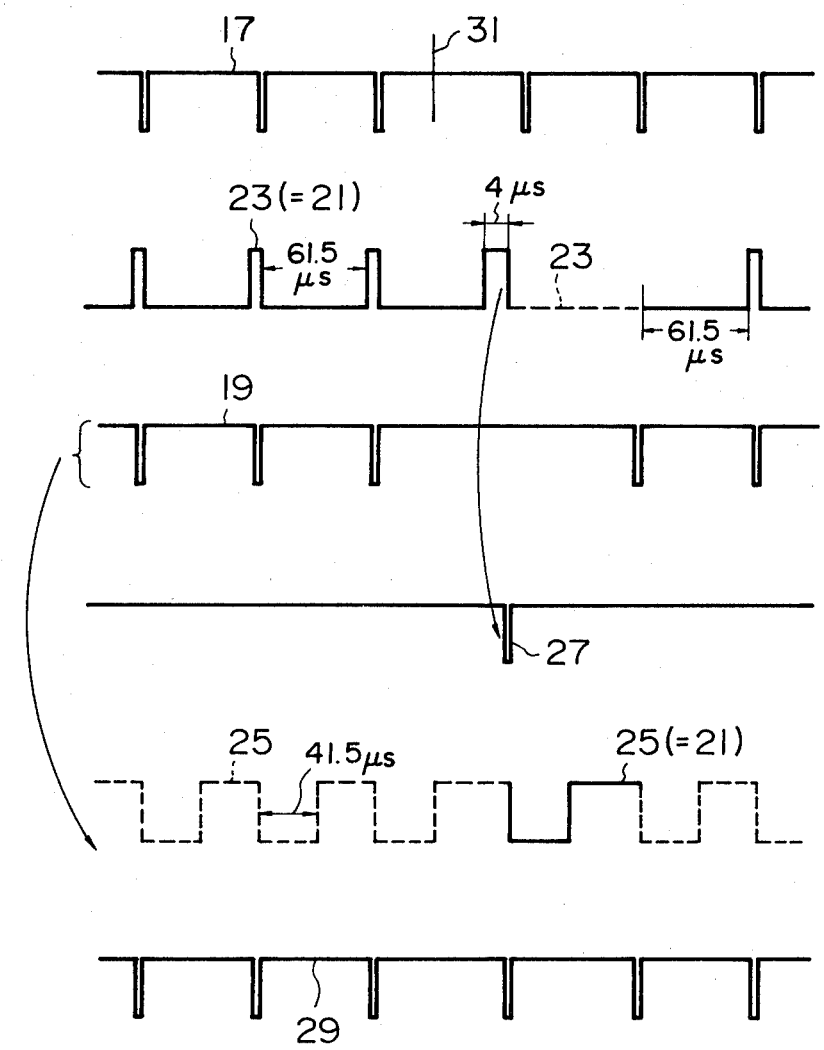

Operation of the sync signal detection protective circuit shown in FIG. 1 will now be described with reference to the signal timing charts shown in FIGS. 2 through 4. FIG. 2 shows the waveforms of the sync signal and the time gate pulse before and after the head switching point 31 for the case without occurrence of skew. FIGS. 3 and 4 show the waveforms of the same signals when skew occurs.

Operation without occurrence of skew will be described first. The time gate pulse 23 of 61.5 $\mu$s selected primarily by the switching circuit 7 opens the gate circuit 5 to detect the sync signal 19. When the sync signal 19 is detected, the time gate circuit 9 of 61.5 $\mu$s is reset, and a time gate pulse 23 is generated again after 61.5 $\mu$s. The time 61.5 $\mu$s is determined basing on the period of the sync separation output 17 (composite sync signal) of approximately 63.5 $\mu$s and also in consideration of the tape speed deviation of the VTR and jitters. But it does not need to be limited to this value. Accordingly, during the period of 61.5 $\mu$s, the sync separation output 17 is get rid of other components than that of the sync signal, such as noises, head switching noises, vertical sync pulses and equalizing pulses. After 61.5 $\mu$s, the gate circuit 5 opens again to detect the subsequent sync signal 19. The sync separation output 17 detected in this way is outputted as a sync signal 19 which is free from noises. In this case, the time gate pulse 25 is not selected by the switching circuit.

Next, the operation of the circuit in the occurrence of skew will be described with reference to FIG. 3. FIG. 3 shows the case where the period of the sync separation output 17 is shortened due to skew. This signal is not passed through the gate circuit 5 since the sync separation output 17 enters while the gate circuit 5 is being closed by the time gate pulse 23. Therefore, after around 63.5 $\mu$s following the detection of the previous sync signal 19, the sync signal 19 will not be detected. Since the time gate circuit 9 is reset after 65.5 $\mu$s, the gate circuit 5 is closed after 65.5 $\mu$s. In this case, the 1H delay circuit 13 outputs a compensatory sync signal 27 (1H time delay signal) at 65.5 $\mu$s time after the detection of the previous sync signal, and at the same time the switching circuit 7 is set in order to select the time gate signal 25. The time gate circuit 11 set by the 1H time delay signal generates then a time gate pulse 25 after 41.5 $\mu$s to open the gate circuit 5. The time gate circuit 11 continues to generate the gate pulse 25 until it is reset by the sync output 29, and thus the gate circuit 5 is kept open until the sync separation output 17 is detected. The time 65.5 $\mu$s is determined in consideration of the tape speed deviation of the VTR and jitters as in determining the time 61.5 $\mu$s, and it does not need to be limited to this value. Another time gate period is set to 41.5 $\mu$s on the assumption that the maximum skew time is 20 $\mu$s, and it should also be determined depending on the performance of the VTR. Because of using a time gate of 41.5 $\mu$s after supplemented by the sync signal 27, the gate circuit 5 is prevented from blocking two successive sync separation output 17 by opening the time gate circuit after 41.5 $\mu$s so far as the maximum value of the skew is less than 20 $\mu$s, thereby allowing the capture of the following sync separation output 17 just after the blocked output 17. The time gate circuit 9 of 61.5 $\mu$s is set by the sync signal 19 detected by the time gate pulse 25, and the switching circuit 7 operates to select the time gate pulse 23, whereby noise immunity of the gate circuit 5 is improved and the failure of the operation is prevented.

Next, the operation of the case where the period of the sync separation output 17 is elongated due to skew will be described with reference to FIG. 4. In this case, opposite to the case of FIG. 3, the gate circuit 5 is opened 61.5 μs after the sync signal 19 has been detected and kept open to the point of 65.5 μs. However, the sync separation output 17 is not received due to skew, and therefore the supplementary sync pulse 27 is supplied and at the same time the switching circuit 7 is switched to receive the time gate pulse 25. Accordingly, the sync separation output 17 elongated by skew is not outputted by the gate circuit 5 which is closed by the time gate pulse 23. After 41.5 μs has elapsed, the gate circuit 5 is opened by the time gate pulse 25 and kept opened until the subsequent sync separation output 17 is detected. When the sync separation output 17 is detected, the time gate circuit 9 is set again and the switching circuit 7 selects the time gate pulse 23, whereby noise immunity is improved and the failure of the operation is prevented.

Figure 5:
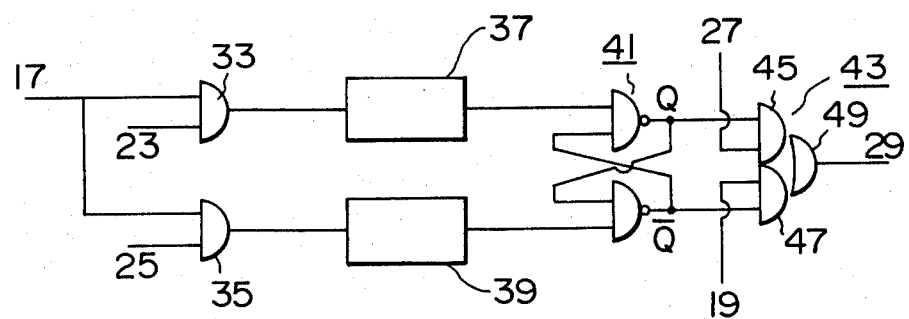
FIG. 5 is an example of a detailed circuit diagram of the sync signal switching circuit shown in FIG. 1.

FIG. 5 shows in detail the arrangement of the sync signal switching circuit 15. In the figure, an AND gate 33 receives the sync separation output 17 and the 61.5 μs time gate pulse 23, and an AND gate 35 receives the sync separation output 17 and the 41.5 μs time gate pulse 25. A circuit 37 serves as a waveform shaping circuit to create a "missing" pulse when the sync separation output 17 has not been detected during the period from 61.5 μs to 65.5 μs, and to generate no output pulse when the sync separation output 17 has been detected. A waveform shaping circuit 39 operates to generate an output pulse when the sync separation output 17 has been detected by the 41.5 μs gate pulse 25. Reference number 41 is a flip-flop, 43 is a complex gate including AND gates 45 and 47, and an OR gate 49.

When skew does not occur, the sync separation output 17 is detected by the AND gate 23, and the waveform shaping circuit 37 does not produce the output pulse. On the other hand, when the AND gate 35 detects the sync separation output, the waveform shaping circuit 39 produces an output pulse, causing the $\overline{Q}$ output to go "1," and the complex gate 43 conducts the sync signal 19. If skew occurs and the sync separation output is not detected, the circuit 37 creates a "missing" pulse to bring the Q output of the flip-flop 41 to "1," and the complex gate 43 conducts the supplementary sync signal 27. The 41.5 μs time gate circuit 11 is set again by the sync signal 27. However, the 61.5 μs time gate 9 is not set since the sync signal 19 has not been detected. Thus, only the AND gate 35 detects the sync separation output 17, and the complex gate 43 is set so as to conduct the sync signal 19.

Figure 6:
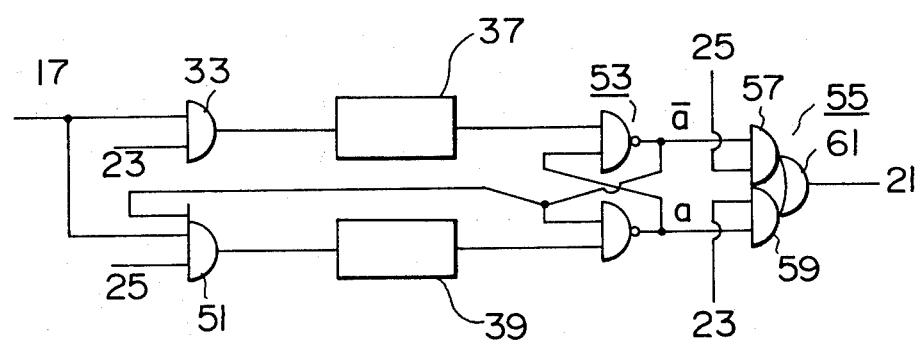
FIG. 6 is an example of a detailed circuit diagram of the time gate signal switching circuit shown in FIG. 1.

FIG. 6 shows in detail the arrangement of the time gate signal switching circuit 7. Since this circuit arrangement resembles that of FIG. 5, the same reference numbers are used for the common portions and the explanation thereof will be omitted. In FIG. 6, an AND gate 51 receives the sync separation output 17, the 41.5 μs time gate pulse 52 and the $\overline{a}$ output of a flip-flop 53. An AND gate 57 receives the $\overline{a}$ output of the flip-flop 53 and the 41.5 μs time gate pulse 25. An AND gate 59 receives the $\underline{a}$ output of the flip-flop 53 and the 61.5 μs time gate pulse 23. Reference number 61 is an OR gate. A complex gate 55 is made up of AND gates 57 and 59, and an OR gate 61.

When skew does not occur, the waveform shaping circuit 37 does not create a "missing" pulse. The $\overline{a}$ output of the flip-flop 53 stays at "0" and the AND gate 57 does not operate. Conversely, the $\underline{a}$ output of the flip-flop stays at "1," causing the AND gate 59 to conduct the 61.5 μs time gate pulse 23. Then, the 61.5 μs time gate pulse 23 is selected as the gate signal 21 for controlling the gating time of the gate circuit 5. If skew occurs and the sync separation output 17 is not detected, the waveform shaping circuit 37 creates a "missing" pulse to bring the $\overline{a}$ output of the flip-flop to "1" while leaving the $\underline{a}$ output at "0." Then the complex gate 55 conduct the 41.5 μs time gate pulse 25 as the gate signal 21. The subsequent sync separation output 17 passes the AND gate 51, causing the waveform shaping circuit 39 to produce an output pulse. Then the $\underline{a}$ output becomes "1," and the complex gate 55 selects the 61.5 μs time gate pulse 23 as the gate signal.

When the sync signal detection protective circuit according to the present invention, in which two types of time gate signals are used selectively, is applied to the PCM recording and reproducing system utilizing a VTR, the horizontal sync signal can be protected from the occurrence of skew and noises.

In the sync signal detection protective circuit of this invention, it may be assumed that a failure of the operation would result if two or more sync signals were missed consecutively causing an inconsistency in the number of original sync pulses and conducted sync pulses. However, the VTR generally incorporates a DOC (dropout compensator), and data is recorded on the tape in frequency modulation that causes the occurrence of dropout to produce a burst noise. Therefore, the burst noise may be detected as a sync signal for a dropout which occurs when the gate circuit 5 is open for receiving the sync separation output, and there is no practical problem. The present invention has been described by way of particular embodiment for the PCM recording/reproducing apparatus utilizing a VTR. However, it is obvious that the present invention can be applied to the PCM formatted disc (digital audio disc), particularly when the property of noise immunity is taken into consideration.

What we claim is:

1. A synchronizing signal detection protective circuit for detecting a synchronizing signal on a recording medium with information to be recorded and the synchronizing signal being consecutively recorded thereon, comprising:

a first time gate circuit for generating a first time gate signal at a first predetermined time before an expected occurrence of said synchronizing signal;

a second time gate circuit for generating a second time gate signal at a second predetermined time before said expected occurrence of said synchronizing signal, said second predetermined time occurring before said first predetermined time;

a time gate signal switching circuit connected to said first and second time gate circuits and adapted to generate selectively one of said first time gate signal and second time gate signal;

a synchronizing signal gate circuit connected to said time gate signal switching circuit and adapted to control the gating time for detecting said synchronizing signal in response to one of said first and second time gate signals;

a compensatory synchronizing signal generating circuit for generating a compensatory synchronizing signal; and a synchronizing signal switching circuit which conducts the synchronizing signal when said synchronizing signal has been detected by said synchronizing signal gate circuit in response to either one of said first and second time gate signals, and conducts said compensatory synchronizing signal when the synchronizing signal has not been detected by said synchronizing signal gate circuit in response to said first time gate signal.

2. A synchronizing signal detection protective circuit according to claim 1, wherein said first time gate signal has a predetermined time gate duration determined by the synchronizing signal when it is detected by said gate circuit and has a predetermined maximum time gate duration only when said synchronizing signal is not detected by said gate circuit.

3. A synchronizing signal detection protective circuit according to claim 1, wherein said second time gate signal has a time gate duration which is determined by either one of the synchronizing signal and said compensatory synchronizing signal conducted through said synchronizing signal switching circuit.

4. A synchronizing signal detection protective circuit according to claim 1, wherein said time gate signal switching circuit takes precedence in selecting said first time gate signal, and selects said second time gate signal when said synchronizing signal has not been detected by said synchronizing signal gate circuit.

5. A synchronizing signal detection protective circuit according to claim 1, wherein said compensatory synchronizing signal generating circuit comprises a delay circuit which delays said synchronizing signal detected by said synchronizing signal gate circuit by one period of said synchronizing signal.

* * * * *